(12) United States Patent
Zanesi (10) Patent No.: US 12,321,802 B2
(45) Date of Patent: Jun. 3, 2025

(54) MULTILAYER ELECTRONIC DEVICE AND METHOD FOR THE CONSTRUCTION AND FIXING OF THE DEVICE

(71) Applicant: ME Innovation SRL, Manocalzati (IT)

(72) Inventor: Davide Zanesi, Lecco (IT)

(73) Assignee: ME Innovation SRL, Manocalzati (IT)

( * ) Notice: Subject to any disclaimer, the term of this patent is extended or adjusted under 35 U.S.C. 154(b) by 0 days.

(21) Appl. No.: 17/458,714

(22) Filed: Aug. 27, 2021

(65) Prior Publication Data

US 2021/0390361 A1    Dec. 16, 2021

Related U.S. Application Data (62) Division of application No. 16/317,037, filed on Jan. 11, 2019, now abandoned.

(51) Int. Cl.
*G06K 19/077* (2006.01)
*B32B 3/08* (2006.01)
(Continued)

(52) U.S. Cl.
CPC ............ *G06K 19/0776* (2013.01); *B32B 3/08* (2013.01); *B32B 5/022* (2013.01); *B32B 5/26* (2013.01);
(Continued)

(58) Field of Classification Search
CPC ............ G06K 19/0776; G06K 19/027; G06K 19/0723; G06K 19/07722; B32B 3/08;
(Continued)

(56) References Cited

U.S. PATENT DOCUMENTS 3,964,529 A * 6/1976 Brod .................. A45C 1/02
                                                    206/223
7,417,550 B2 * 8/2008 Brown ............ G06K 19/07749
                                                    343/873
(Continued)

FOREIGN PATENT DOCUMENTS

CN        204229445 U   *   3/2015
CN        206644184 U   *  11/2017
(Continued)

OTHER PUBLICATIONS

FANUC America Corporation, "Robotic Pick and Place at 182 Parts/minute—FANUC's M-2iA Delta Robot Picks Breather Caps" YouTube Video dated Jul. 25, 2014. Available at <https://www.youtube.com/watch?v=DJt2tGszp6U> (Year: 2014).*

*Primary Examiner* — Alex B Efta
*Assistant Examiner* — Alexander S Wright
(74) *Attorney, Agent, or Firm* — Jose Cherson Weissbrot (57) ABSTRACT

A method and a multilayer device is described which allows the use of known and present electronic, passive electronic devices on the market or other electronic devices, making them one-piece with textiles or polymers through the use of heat-sealing materials and creating a stable innovative device. The method includes unrolling and resizing of a first layer of a textile material, positioning and gluing of an electronic device on the first layer, closing the electronic device on the first layer with a second layer of textile, thermopressing the first and second layers in which the electronic device sandwiched therebetween.

5 Claims, 3 Drawing Sheets

(51) Int. Cl.
| | |
|---|---|
| B32B 5/02 | (2006.01) |
| B32B 5/26 | (2006.01) |
| B32B 7/12 | (2006.01) |
| B32B 27/00 | (2006.01) |
| B32B 27/08 | (2006.01) |
| B32B 27/12 | (2006.01) |
| B32B 27/18 | (2006.01) |
| B32B 27/20 | (2006.01) |
| B32B 27/22 | (2006.01) |
| B32B 27/36 | (2006.01) |
| B32B 29/02 | (2006.01) |
| B32B 37/12 | (2006.01) |
| B32B 38/00 | (2006.01) |
| G06K 19/02 | (2006.01) |

(52) U.S. Cl.
CPC ........... *B32B 7/12* (2013.01); *B32B 27/08* (2013.01); *B32B 27/12* (2013.01); *B32B 27/18* (2013.01); *B32B 27/205* (2013.01); *B32B 27/22* (2013.01); *B32B 27/36* (2013.01); *B32B 29/02* (2013.01); *B32B 37/1284* (2013.01); *B32B 38/0004* (2013.01); *G06K 19/027* (2013.01); *B32B 27/00* (2013.01); *B32B 2255/02* (2013.01); *B32B 2255/26* (2013.01); *B32B 2260/023* (2013.01); *B32B 2260/046* (2013.01); *B32B 2262/02* (2013.01); *B32B 2262/0276* (2013.01); *B32B 2262/062* (2013.01); *B32B 2262/08* (2013.01); *B32B 2262/101* (2013.01); *B32B 2262/106* (2013.01); *B32B 2264/10* (2013.01); *B32B 2307/204* (2013.01); *B32B 2307/3065* (2013.01); *B32B 2307/31* (2013.01); *B32B 2307/40* (2013.01); *B32B 2307/41* (2013.01); *B32B 2307/546* (2013.01); *B32B 2307/71* (2013.01); *B32B 2307/714* (2013.01); *B32B 2307/7265* (2013.01); *B32B 2307/732* (2013.01); *B32B 2419/04* (2013.01); *B32B 2425/00* (2013.01); *B32B 2439/70* (2013.01); *B32B 2439/80* (2013.01); *B32B 2457/00* (2013.01); *B32B 2457/12* (2013.01); *B32B 2519/00* (2013.01)

(58) Field of Classification Search
CPC .. B32B 5/022; B32B 5/26; B32B 7/12; B32B 27/08; B32B 27/12; B32B 27/18; B32B 27/205; B32B 27/22; B32B 27/36; B32B 29/02; B32B 37/1284; B32B 38/0004; B32B 27/00; B32B 2255/02; B32B 2255/26; B32B 2260/023; B32B 2260/046; B32B 2262/02; B32B 2262/0276; B32B 2262/062; B32B 2262/08; B32B 2262/101; B32B 2262/106; B32B 2264/10; B32B 2307/204; B32B 2307/3065; B32B 2307/31; B32B 2307/40; B32B 2307/41; B32B 2307/546; B32B 2307/71; B32B 2307/714; B32B 2307/7265; B32B 2307/732; B32B 2419/04; B32B 2425/00; B32B 2439/70; B32B 2439/80; B32B 2457/00; B32B 2457/12; B32B 2519/00; B32B 5/026; B32B 2250/44; B32B 2255/205; B32B 2307/202; B32B 2437/00; B32B 3/04; B32B 2255/10; B32B 5/02; B32B 2262/0261; B32B 2519/02; B32B 2535/00; B32B 27/40; B32B 37/226

See application file for complete search history.

(56) References Cited

U.S. PATENT DOCUMENTS

| | | | |
|---|---|---|---|
| 2004/0094949 A1* | 5/2004 | Savagian | G06K 19/07749 283/81 |
| 2014/0191040 A1* | 7/2014 | Cervellati | G06K 19/07722 235/488 |
| 2015/0278671 A1* | 10/2015 | Martin | B32B 37/1284 29/601 |
| 2016/0148086 A1* | 5/2016 | Clarke | G06K 19/027 235/492 |
| 2017/0232709 A1* | 8/2017 | Inubushi | B32B 15/085 428/461 |

FOREIGN PATENT DOCUMENTS

| | | | | |
|---|---|---|---|---|
| EP | 2187342 A1 | * | 5/2010 | |
| WO | WO-2014053005 A1 | * | 4/2014 | |
| WO | WO-2016024381 A1 | * | 2/2016 | |
| WO | WO-2016056625 A1 | * | 4/2016 | B32B 27/18 |

\* cited by examiner

MULTILAYER ELECTRONIC DEVICE AND METHOD FOR THE CONSTRUCTION AND FIXING OF THE DEVICE

FIELD OF INVENTION

The present invention refers to the innovative field of applicability of electronic devices on textile and/or semirigid supports. In particular the invention refers to the application to textiles, polymers and semirigid structures of a device for the conservation of digital data. This application is obtained with innovative solutions that lead to the creation of an equally innovative device.

BACKGROUND OF THE INVENTION

Known devices capable of interacting with smartphones, tablets, computers, or other electronic devices by means of radiofrequency systems (RFID) or through the NFC code, a unified and consolidated data transmission system, constitute a cutting-edge sector and of great economic interest: the possibility of memorizing and storing information is a very important factor in many application fields, such known devices here onwards will be defined tags. (Think of the areas of logistics, anti-counterfeiting, marketing and promotion).

As we will further clarity, these known devices. i.e. "tags," presently have features that make them difficult to be used on textile supports or in any a case on less rigid supports, subject to continuous bendings, presenting limitations and draw backs. The possibility of effectively use these products on a textile support, therefore the possibility to apply them to garments or fabrics in general would open up important opportunities in a number of areas.

In this regard, other inventions have already been presented but with different technological solutions.

A further and different approach to the solution to the technical problem will be presented here.

Finding new and different solutions for using chips or tags on textile or flexible supports is particularly interesting for the development of new markets and to meet the needs of innovation and economic savings that are at the heart of current economy.

There is therefore a particular interest in increasingly technically advanced systems, which at the same time are economical and appear "aesthetically" as a symbol of technological advancement.

Still, there is a research going on for systems that are possibly integrated so as to create as little encumbrance as possible, optimizing comfort, aesthetics and functionality.

The field of electronic devices applicable to textile products is a clear example of what has been described above.

In particular, innovative solutions will be introduced here that allow to protect and improve the performance of "traditional" chips eliminating or significantly reducing their fragility and, moreover, as a factor of particular innovation for skilled persons, allow for heat-sealing on their definitive use supports.

This novelty will allow not only to increase the use of electronic tags in the fields where they are already commonly used, but to open their use to so far unthinkable new functions.

In said invention, the radiofrequency devices namely tag as said above must be taken as references.

This technology uses an electromagnetic signal having a standardized frequency from 125 kHz to 5.8 Ghz (e.g. 13.56 MHz in the NFC encoding) to exchange information from a "reader" device to a "tag" device in a "contactless" fashion.

Since the tag device generally lacks its own power supply and is therefore powered by the carrier coming from the reader, it is obvious that the energy coupling of the two devices is crucial. From antenna theory it is known that to emit an electromagnetic wave at a certain frequency and thus having wavelength equal to $$\lambda = c/f$$

where "c" is the speed of light and "f" the frequency of the wave, an antenna having dimensions of at least half-wavelength must be used. By performing the calculations a $\lambda=22$ meters is found, then an antenna of 11 meters is needed to propagate the wave.

Since the antennas commonly used in the RFID or NFC field are instead of very small dimensions compared to the just calculated magnitudes, it is more appropriate to deal with the question from a point of view of coupling the fields between the two devices rather than referring to antennas and electromagnetic fields. This is the reason for the limited operating range of the NFC technology. The NFC technology is commonly used for contactless communications based on standardized radiofrequency identification (RFID) using magnetic field induction to allow communication between electronic devices, including mobile wireless communication devices. These short-range communications are usually used for payment and purchase services, such as electronic keys, for device identification or for configuration services, or for sharing information.

This wireless technology allows to exchange data between devices within a few centimeters of space and is commonly used by portable communication devices to replace Wi-Fi or Bluetooth solutions.

To date, the most popular products using the NFC technology are rigid or semi-flexible supports. More commonly, NFC devices are mounted on plastic supports made of polymers. Most used are PET and PU. The present variants of this solution include either replacing a plastic support with paper, or mounting directly on a fabric, such as for smart labels.

It is now well-known to skilled persons that the realization of a rigid or semi-flexible NFC device presents, in the practical use phase, many problems that have slowed the development and implementation of projects with such technology due to limits of objective feasibility (easy disruption of the device, fragility of the component parts, little overall stability of tags since they are not structurally self supporting).

Currently tags are only glued or "sewn" between two edges of fabric. In this way, the tag is exposed to stresses that often make the device unusable as it is subject to excessive bending, constant stresses, and so on.

Usually existing tags (die+antenna+support) are made, as already mentioned, by printing or coupling a spiral conductive layer on a polymer or different support. To operate, the antenna must be dimensioned correctly in order to obtain an inductance capable of reacting to the transmission wavelength (of 13.56 MHz in the case of NFC systems). Consequently, conductive "loops" are generated, of which all measurements are calculated. At the end of the loop, an electronic chip or electronic DIE (doped silicon) is sealed or glued.

Many solutions so far realized, however, are to be considered as an expedient to make a NFC tag one-piece with a flexible support.

In addition, despite the indications provided by various manufacturers, the traditional tags show disadvantageously a partial waterproofing and often not entirely adapted to the typical needs of the textile world.

Moreover, as stated in many texts, conductive traces made on flexible supports must comply with rules that impose a limit on tolerable bends. Consequently, these traces are less resistant to bendings, especially to the lateral ones. Based on several tests carried out on these products, it was noticed that the breaks were often linked to the failure of the chip sealing on the conductive traces.

Furthermore, the spiral composition through which the electronic circuit is printed and the positioning of the microchip or electronic die by sealing or bonding make the whole tag device extremely fragile and vulnerable. Breaking or tampering with only one such spire, as well as disconnecting the chip, will result in the inoperability of the entire system. Because of the delicacy of the product, there has been a waiver of the use of this technology in various areas.

In particular, document US 2015/278671 describes a system for making a traditional tag thermo-adhesive by drawing a heat-activated paint. This layer allows to apply a plastic label to the fabric under heat. It is not clearly indicated which technology is used to implement such application. In particular, the solution describes the use of a PSA layer to keep the tag temporarily in position before said tag is finally applied to the fabric, said solution thus having the prior art problems aforementioned. Said device appears to be suitable for temporary use for tracking clothing apparel, as it is known that such a realization has a short life. In particular, it is not indicated how the final fixing takes place, but substantially any fixing method would not solve the problems mentioned. It seems that the tag antenna is made by sewing the conductive elements in the device, making this realization rare and not much used in general. Thus, the invention is fragile, easily subjected to breaking due to bending or shocks, and is subject to breakages also if contacted with moisture, and so on.

The document EP 2187342 describes a device designed to increase the life span of tags used for industrial laundries, in particular the device appears to be resistant to temperatures and is waterproof, it is not indicated how such a device is applied to the fabric, nor how the internal elements of the device are positioned, the elements including the chip appear to be covered with epoxy resin, the purpose of this device, as well as the materials used are strictly indicated for the claimed scope and are therefore of little interest to the solution of some technical problems covered by the present invention which are in particular directed to tags applied to wearable objects.

Document US20041094949 discloses in particular a multi-layer device consisting of a plurality of layers, which can be activated by means of heat capable of protecting the tag. Such a device requires a particular mold to provide the form and the consistency required for operation The multilayer is obtained entirely on polymeric materials of varying nature. Between a layer and the other it is interposed a meltable material. The end result is similar to a semi-flexible silicone structure but obviously with superior mechanical characteristics being a composite material. This device is designed for labeling therefore it does not deal or intend to address the problems of the possible coupling of a tag with a woven fabric or the like, in this case there are not mentioned fixing systems or methods that are not of interest here.

Moreover the document US 2014/209690 describes a tag made directly and in one-piece with a fabric, so that the antenna part is made directly on the fabric, the tag is therefore not a separate device applied to the fabric, but becomes an integral part of it; The device is therefore composed of a rigid part on which the electronic die and the electronic connectors are pre-assembled. The dipole antenna is made instead on fabric by means of conductive wires, the coupling system of the two modules is claimed.

This solution has been the subject of multiple studies and patent applications, but it has proved that apart from being a laborious solution, the tag is poorly stable and resistant. In any event, this solution is beyond the scope and objectives as well as from the technical problems covered by the present invention.

SUMMARY OF THE INVENTION

A principal object of the present invention is therefore to develop technical solutions aimed at eliminating the previously encountered criticalities as described in the introductory part and thereby increasing the use of tags in the fields of clothing, of furnishing and, more generally, for applications on textile and/or flexible supports.

In particular, the present invention is particularly advantageous for applying radio frequency electronic modules, namely tags already present on the market with a different use by creating a new device with considerable time savings and lowering costs.

These devices are designed for product tracking and/or application on fabrics or other rigid or less rigid supports, while maintaining their own strength. These devices only work in the presence of special readers and are interfaceable with commercial smartphones.

In a particularly advantageous and innovative way, these tags in the present invention are transformed by joining to the tag module at least two layers of specially shaped thermo-adhesive material which allows, once heated and pressed, to create a new device having its own physical characteristics, stabilizing the tag included herein.

The present invention realizes thermoadhesive multilayer device suitable for being sealed on a textile substrate in one piece with the same substrate, comprising at least heat-sealing materials, bi-adhesive heat-sealing materials, electronic elements such at least an inlay realized RFID or NFC tag, said tag being positioned between at least a first layer of heat-sealing material and a second layer of heat-sealing bi-adhesive material and heat-sealed between said layers in order to stabilize said tag, said multilayer device being heat fixed on said textile substrate in one piece.

Such a device at a later stage is adhered directly to a fabric or a polymeric material.

It is known to skilled persons that heat sealing is traditionally used for ornamental or productive purposes in the various areas where textile substrates are used, but has never been used to create an innovative device.

It should be noted that, by combining a technology that is typical of the textile field with technologies typical in the electronic field, innovative solutions are created that allow to orient towards new economic and commercial scenarios.

The present invention will describe various preferred embodiments, all based on the same principle that will be embodied in a method of realization which will lead to different embodiments, including using, for example, different materials, all useful for the purposes and of the present invention, each variant having different features and utilities, but all variants solving the technical problems mentioned above, and in a particularly advantageous way all the variants will realize the tag stabilization before the application.

The realization of said device can occur for example, by implementing on the traditional tag a dielectric polymeric material, water-repellent, and thermo-adhesive, realizing in such a way advantageously and innovatively a multilayer structure.

The advantage of a multilayer structure, in addition to enhancing the overall features of the device itself, is the resistance opposed to any breaks in the tag. In addition, in a further advantageous way, the device, besides giving stability to the tag, allows the application of the device, thanks to the heatable substrate, directly on a fabric or material suitable for the purpose.

Even more advantageously, the layers of said device allow to reduce the moisture content that passes through the barrier formed by the layers themselves and consequently improve the durability and reliability of the device.

These and further advantages obtained by the thermo-adhesive passive radio frequency electronic device described in the present invention, suitable to be sealed onto a textile support in one-piece with the substrate itself, and more specific details and various embodiments with its relative method of realization, will be described below.

BRIEF DESCRIPTION OF THE DRAWINGS

The advantages will become apparent by reading the following description of some of the preferred embodiments, referred to in the attached drawings.

In particular, as mentioned above, the attached figures represent various preferred embodiments and realization phases of the present invention, however, such embodiments have a descriptive and explanatory character but are not limiting the subject-matter of the present invention.

DETAILED DESCRIPTION OF THE INVENTION

Figure 1:
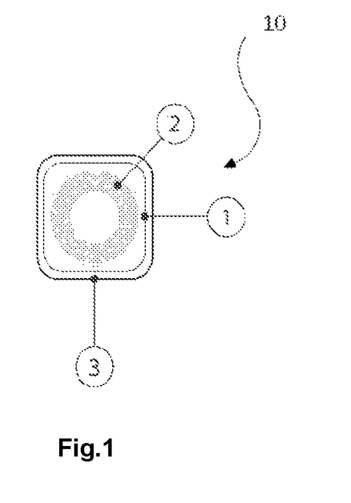
FIG. 1—Realization example of a passive electronic thermo-adhesive radio frequency device suitable to be sealed onto a textile support in one-piece with the substrate itself—in projection.
Figure 2:
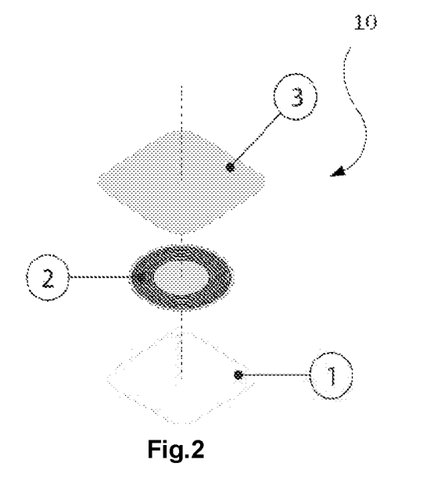
FIG. 2—Realization example of a passive electronic thermo-adhesive radio frequency device suitable to be sealed onto a textile support in one-piece with the substrate itself—in exploded view.
Figure 3:
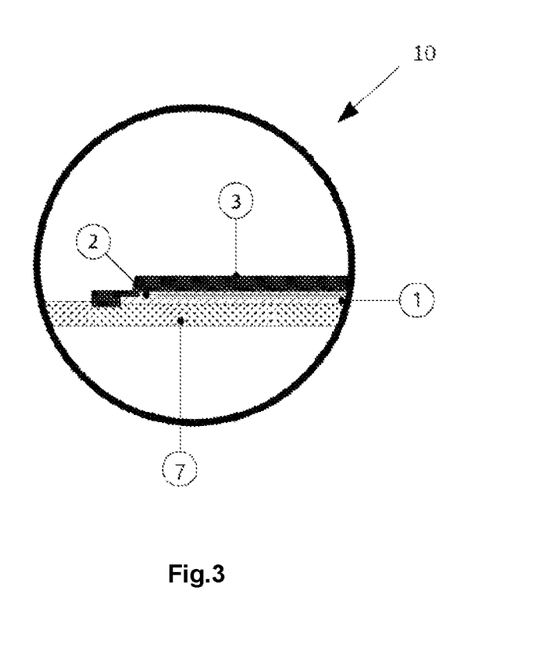
FIG. 3—Realization example of a passive electronic thermo-adhesive radio frequency device suitable to be sealed onto a textile support in one-piece with the substrate itself—in a sectional view of the substrate.

With reference to the accompanying figures, particularly FIGS. 1, 2, 3, it is generally observed that electrically conductive materials, dielectric materials and heat-sealable polymers are preferably used for the assembly process.

It will be noted with respect to the multilayer device described below that it comprises at least one tag or electronic element suitable for the purpose; for simplicity it will be referred to below as tag but it must be considered that one or more electronic elements may be included of different kind in said innovative multilayer device, including those described in the text or further devices suitable for the purpose.

In a preferred embodiment, the innovative devices (which will be described below) are applied by heat-sealing or thermopressing on various textile substrates, preferably polyester, cotton, non-woven fabrics, technical fabrics, coupled fabrics or coated fabrics.

As shown in the figures hereinafter described in more detail, the new device 10 may include, for example, a multilayer composed of thermally sealable dielectric material 3 and/or a bi-adhesive and waterproof heat-sealing material 1, for example based on polyurethane, at least a traditional plastic tag 2 with an inlay antenna usually in aluminum and, a sealing layer and a seal, a polyurethane-based heat-sealable material.

To the innovative device an innovative method suitable for the realization of one or a plurality of variants of said device may correspond, but in any manner whatsoever it is produced, the innovative device described herein is a fundamental object of the present invention.

With regard to the method, starting from the thermosealable bi-adhesive material 1, the production of the device can occur by means of roll processing, sheets processing or by means of pieces already cut with definite geometry;

the sizing can for of example by laser cutting, cutting, die-cutting or mechanical cutting;

subsequently to the polymeric layer, such as a bi-adhesive PU, a plastic tag is applied, for example with NFC coding;

In the present invention, for temporarily fixing the tag 2 to at least one top and/or bottom layer, it is possible to bond the element with glues, spray glues, or the like.

Note that in case of sheet or roll processing, the individual tag 2 are positioned on a rigid or semi-rigid lyner to ensure positioning and centering with the remaining elements of the device.

After such application the tag 2 is positioned at a precise point using a Cartesian mechanical arm or a "pick & place" system. To attach the device, a glue applied under the device or directly to the lower sub-layers is used.

The multilayer thus formed is closed with a second dielectric layer also formed with the techniques previously indicated.

Dielectric material can be a thermally sealable polymer such as PU.

Once the multi-layer system has been created, in the case of roll or sheet processing, the individual pieces are cut through mechanical or laser cuts.

The thickness or the geometry of the polymeric dielectric layer have no influence on the operation of the device, modifying only the final product finish and the flexibility of the device.

[Excursus: Traditionally, the tag 2 is made from polymers coated with conductive materials, such as aluminum or copper. Through mechanical or chemical removal operations excessive material is removed and the antenna named "inlay" takes shape. It is possible to use any conductive material. The thickness of the conductive layer vanes from 2.5 microns to 200 microns. The thickness of the lamina does not affect the final functionalities of the device.

Moreover, the conductive layer can also be printed by a serigraphic or ink-jet process or obtained by molding in 3D. At the end of the inductive structure realization, the electronic DIE is sealed as is known in the art and the tag 2 is closed with a further layer of polymeric material.

It should be noted that better results were obtained with a circular polymeric tag 2 of outer diameter of 18 mm and with an antenna of diameter of 15 mm tag 2 of different shapes and sizes have given better or worse results depending on the dimensions of the reader antenna (electromagnetic-wave transmitter element).

The above-mentioned tag 2 contains the DIE in it so that it respects the norms and the tuning at 13.56 Mhz.]

It is important to emphasize that one of the points which makes this device particularly innovative and advantageous is the possibility of its realization by the use of thermosealing materials with various geometries and thicknesses, tag 2 with various geometries and thicknesses, and the possibility that these are sealed onto textile supports of various nature, in such a way that the device results polyfunctional.

The results obtained have shown that each of the described embodiments is functional and performing, and thus the device allows to realize different applications and to obtain various technological solutions.

It should be noted that the fundamental difference with respect to existing technologies has become apparent since the first experiments of this device. Indeed, during the first experiment, it was found that the device adheres perfectly to the textile substrate 7, thereby becoming solid with the fabric itself, also rendering it complicated if not impossible to separate the layers by significantly improving the multilayer device/fabric or other surface coupling.

Said experiment has demonstrated the ability to realize devices characterized by a high number of geometries obtainable with different adhesion characteristics and dimensions. In addition, verifications by means of special testers have confirmed that the readout values of the device relative to the source are the same as the readings made with conventional non-thermally sealed radiofrequency devices on the fabric.

Furthermore, it is specified that the presence of waterproofing layers in a particularly advantageous manner minimizes the possible deterioration of the product due to moisture or immersion in water.

Lastly, in order to further prolong the life of the device, in some embodiments it may be stiffened by shifting the stress point outside the polymeric "tag 2".

For stiffening the device, with reference to the tag 2, various methods can be used such as rigid "hot melt" resignation, plastic injection molding or, starting from a polymeric lamina, cutting profiles a little larger than the tag 2 and glued to the tag 2 itself. For a longer life of the device it is possible to close the tag 2 between two rigid layers with production technologies similar to those above. The stiffening layer reduces the overall flexibility of the device but increases its durability. The choice will be made as needed.

As a mere example, it should be noted further that, in the context of the radiofrequency devices, the described electronic tags are compatible with standardized encodings and managed by the NFC consortium. Specifically, reference is made to ISO 14443 typeA.

The fabric used as an example is preferably a polyester fabric, or cotton, or cotton-polyester or non-woven fabric. In particular, the process/method for making the innovative multilayer device 10 described by the present invention comprises the following steps:
a) Sizing of the thermoadhesive/bi-adhesive material, or unrolling the bobbin, for example of PU (or base dielectric state)
b) Positioning the layer on a calibrated form or on a calibrated suction plane
c) Application of wet or dry "inlay" plastic tags 2
d) Sizing of a second thermoadhesive/bi-adhesive material, or unwinding of the bobbin, for example of PU.
e) Positioning of the second thermo-adhesive element on a calibrated form or on a calibrated suction plane.
f) Pre-heating of the form to improve adhesion.
g) Thermo-pressing according to the specifications of the required material (3 seconds, 165° C. low pressure for example).

Between each phase, of course, all the centering and feeding phases of the systems for creating multilayer products are performed.

It has been verified that this process, which is accomplished following all the described phases, can be modified according to the technical requirements and performances required by the device.

In particular, the use of dielectric materials such as the PU that are suitable for use on the textile, as they are used, as is known, for the creation of ornaments and the personalization of clothing or furnishings products.

The devices made using the process described above, in a particularly advantageous way, are however flexible and the metal traces on the plastic "tags 2" tend not to be significantly damaged, inhibiting the device, remaining stable and protected in case of limited manipulation of the fabric.

It has also been verified that the water barrier of the dielectric material layers (preferably disposed below and above the tag 2), as well as the encapsulation of the electronic element or tag 2, make the device advantageously effectively resistant to water and moisture.

In addition, the use of thermo-adhesive materials makes it particularly advantageous to quickly apply this device directly on a fabric using technologies known to skilled persons.

A preferred embodiment of the invention, which has proved to be particularly useful and effective, is here illustrated by way of example only: it is very actual to use devices for advertising and marketing activities directly on t-shirt with lightweight cotton and therefore very flexible. In the process according to the present invention, the following steps are preferably carried out to realize a particularly preferred embodiment of the device described in the present invention:

Step:
i. starting from a cotton knitwear (t-shirts, polo shirts, sweatshirts or other, for example jersey fabric 160 grams combed);
ii. positioning on a dummy as well as in the known art;
iii. centering the zone on which the device is to be positioned;
iv. sizing of the first thermo-bi-adhesive dielectric layer such as PU;
v. centering of the plastic tag 2;
vi. sizing of the second thermo-adhesive dielectric layer;
vii. centering of all layers;
viii. thermo-pressing of the various layers to ensure the adhesion of the various "layers"; thus forming the multilayer device;
ix. second thermo-pressing of the multilayer device 10 stabilized on the destination fabric substrate 7, etc.

Eventually, one of the dielectric layers may comprise a further state of adhesive protective film, the dielectric layer may be preferably electrostatic, by heating the adhesive film is removed and the device can be fixed directly to the fabric. Therefore the eventual phase of:
i. unfilming from the protective film (before the device/substrate 7 fixing).

By following this innovative process, the multi-layered product 10 is firmly aligned directly on the t-shirt or other garment. It is possible, by modifying the type of dielectric material used, to make the device on different textile substrates with almost identical results. The cotton knitwear, once worn, contains various information such as promotional formations, links to internet addresses, business catalogs, videos, photos etc. In addition, by using NFC encoding, all digital content can be used on commonly marketed smartphones.

In a particularly advantageous way, for the realization of the innovative device by the equally innovative process/method, it is possible to use any type of commercial tag 2 with various electronic memory and performance capabilities. Moreover it is possible to a variety of tag 2 measures depending on the project's specific needs.

It should be considered that the following solution makes the garment interactive for the whole time period related to the mechanical duration of the traditional tag 2, which the present invention increases significantly.

A further, particularly advantageous embodiment (referring to FIGS. 4, 5, 6) is to create a rigid core around the plastic tag 2 so as to limit if not eliminate the mechanical stress on the tag 2, even if applied directly to the fabric. In such a way the useful life of the product is extended as well as making it water and ironing-resistant.

Figure 4:
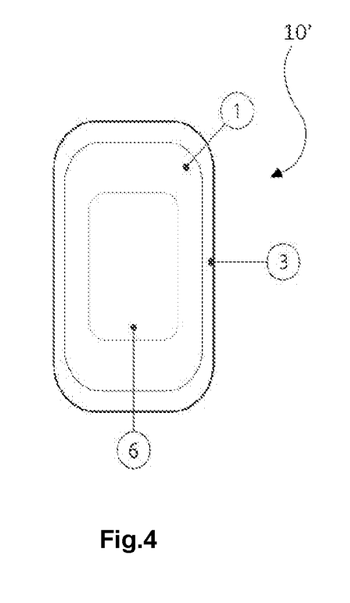
FIG. 4—Realization example of a passive electronic thermo-adhesive radio frequency device suitable to be sealed onto a textile support in one-piece with the substrate itself with stiffening system embedded inside composite materials—in projection.
Figure 5:
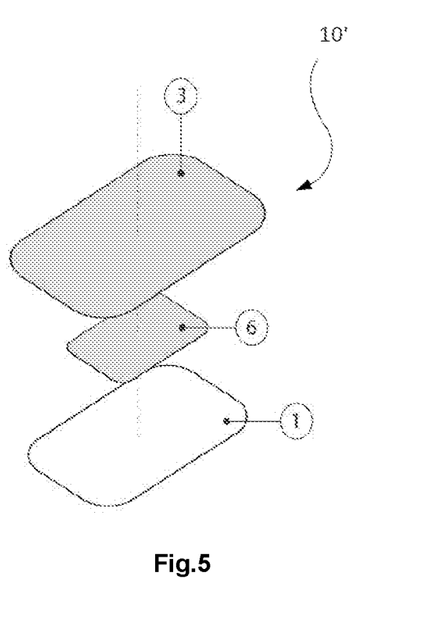
FIG. 5—Realization example of a passive electronic thermo-adhesive radio frequency device suitable to be sealed onto a textile support in one-piece with the substrate itself with stiffening system embedded inside composite materials—in exploded view.
Figure 6:
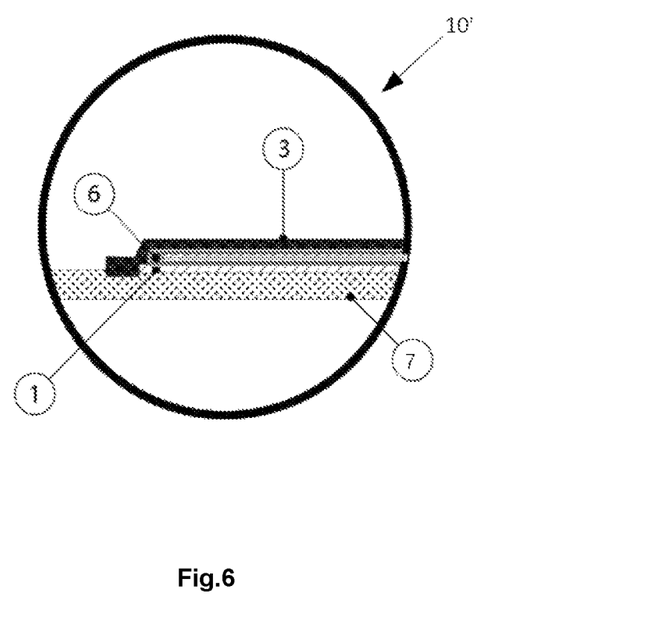
FIG. 6—Realization example of a passive electronic thermo-adhesive radio frequency device suitable to be sealed onto a textile support in one-piece with the substrate itself with stiffening system embedded inside composite materials—section of the multilayer.

More particularly in detail, a form of embodiment of the process/method according to the present invention comprises the following steps:
i. sizing of the thermoadhesive/bi-adhesive material 1, or unrolling the bobbin, for example PU: (i.e. basic dielectric layer)
ii. positioning the base dielectric layer on a calibrated form or on a calibrated suction plane;
iii. sizing of an eventual rigid dielectric material 4 according to known geometry;
iv. application of the tag 2 preferably of plastic preferably adhesive on one of the two layers of rigid dielectric material or resignation with rigid resins such as silicone, polyurethane or epoxy resins, or moreover application in hot-melt technology of dielectric polymer layers, injection printing or 3D printing;
v. eventual sizing of thermoadhesive dielectric sealing material 5;
vi. positioning of a further layer of dielectric heat-sealing material between the two edges of rigid dielectric material to ensure sealing and impermeability between the two layers; it is an additional layer with respect to the previous ones that increases the encapsulation of the tag 2 between the two stiffening layers and also increases adhesion.
vii. positioning of the "core" or rigid module 6 thus obtained;
viii. sizing of a second thermoadhesive/bi-adhesive material 3, or unrolling of the bobbin, for example PU;
ix. positioning of the second thermo-adhesive element on a calibrated form or on an suction plane;
x. preheating of forms to improve adhesion;
xi. thermo-pressing according to specifications of the required material (3 seconds, 165° C., low pressure for example);
xii. sizing of the fabric 7 according to geometry consistent with the creation of new textile products;
xiii. heat sealing of module 6/multilayer device 10 obtained directly on fabric through thermo-pressing according to the specifications of the required materials (15 seconds, 165° C. average pressure as an example)
xiv. eventual unfilming of the protective film of one of the two layers after to application to the fabric.

It is recommended in case it is necessary to increase the life of the device, to implement solutions based on the process just described, namely it will be possible to expand the embodiments of this device without thereby departing from the scope of the present invention in a variety of ways.

Especially for products such as bracelets, clothing, or furnishing it results very advantageous and inexpensive compared to other solutions on the market. In particular, there is shown an embodiment of a thin NFC bracelet comprising the innovative multilayer device 10' created on a textile substrate, said device being created by, for example, the steps of:
i. sizing of the fabric, or unwinding of the bobbin;
ii. positioning on a calibrated form or on a calibrated suction plane;
iii. sizing of the thermo-bi-adhesive dielectric layer;
iv. positioning of the thermo-bi-adhesive dielectric layer;
v. realization of the rigid module 6 as indicated above;
vi. positioning of the rigid module 6;
vii. sizing of the heat-sealing dielectric layer;
viii. positioning of the heat-sealing dielectric layer;
ix. centering of the various layers and thermo-pressing of the multilayer structure;
x. eventual unfilming of the obtained device;
xi. application of a layer of dielectric thermo-bi adhesive material previously sized according to the known technologies
xii. application of a second layer of fabric
xiii. application of two edges of an elastic fabric
xiv. thermopressing to adhere the interior and secure the strap in elastic fabric.
xv. trimming the device by laser cutting, mechanical cutting or waterjet.

This product comprising the device is thinner (about 1.5 mm) and consequently lighter, less bulky and more suitable for everyday use. It also turns out to be very durable and waterproof. The product is suitable for children to wear, to access protected areas, at events and concerts, or in gyms and swimming pools. The extremely complex structure does not allow the manipulation of the electronic part of the device and guarantees a high degree of resistance of the electronic "core" to the water and the weather.

Figure 7:
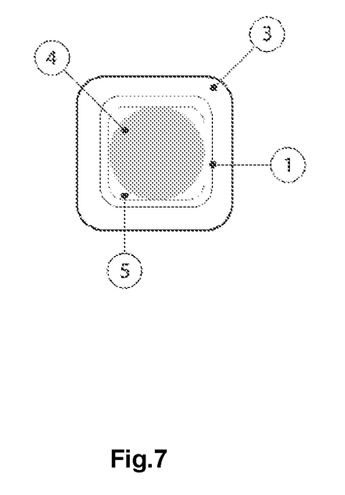
FIG. 7—Realization example of a passive electronic thermo-adhesive radio frequency device suitable to be sealed onto a textile support in one-piece with the substrate itself with stiffening system with rigid polymeric supports—in projection.
Figure 8:
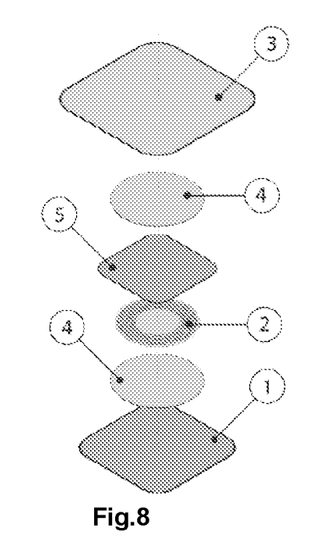
FIG. 8—Realization example of a passive electronic thermo-adhesive radio frequency device suitable to be sealed onto a textile support in one-piece with the substrate itself with stiffening system with rigid polymeric supports—in exploded view.
Figure 9:
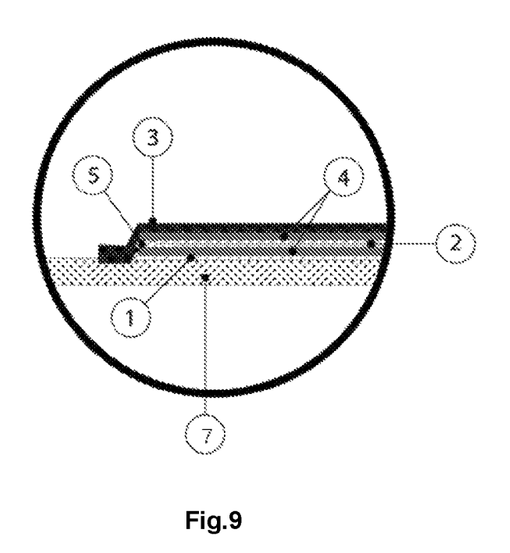
FIG. 9—Realization example of a passive electronic thermo-adhesive radio frequency device suitable to be sealed onto a textile support in one-piece with the substrate itself with stiffening system with rigid polymeric supports—section of the multilayer.

In FIG. 7, 8, 9 is represented a stylization of a further example of preferred embodiment according to the present invention, which demonstrates the effective versatility of the process described herein, is the creation of a multi-layer device 10' with a high rate of durability and reliability required for safety in the workplace.

A realization model of an article comprising a form of embodiment of the long-life NFC multilayer device comprises at least the steps of:
 i. (it is defined as rigid module 6=rigid layers with at least one tag or electron element 2)
 ii. sizing of the of fabric, or unrolling of the bobbin;
 iii. positioning the fabric on a calibrated form or on a calibrated suction plane;
 iv. sizing of the first thermo-adhesive dielectric layer;
 v. centering of the first thermo-adhesive dielectric layer;
 vi. thermo-pressing of the dielectric material;
 vii. realization of the rigid electronic module 6 previously indicated,
 viii. positioning on the fabric;
 ix. by means of a 2-axis controlled deposit system, an additional seal around the module 6 is created in preferably soft silicone material;
 x. sizing of the dielectric thermo-adhesive material;
 xi. centering of module 6 on the thermo-adhesive dielectric material;
 xii. thermo-pressing of the multilayer according to the specifications of the material (20 seconds at 165° C. for example);
 xiii. eventual trimming of the device by laser cutting, mechanical cutting or waterjet.

Similarly to the previous model, the device can be obtained either on a piece or roll and can be soldered directly on a garment or on decorative fabrics, sheets, tablecloths and napkins etc. The experience gained indicates that, as disclosed in other patents, the choice of protecting conductive elements allows greater protection of the metallic layer on the polymeric tag 2 by reducing or eliminating any lesions of the layer itself maintaining a constant functionality performance of the device over time. In a particularly advantageous and innovative way, the NFC multilayer devices stable, meaning that the tag 2 herein comprised benefits from all the advantages shown, even before being attached to the fabric.

This factor makes it very useful for medical uses where, by regulation, high reliability of devices is required, which, in an emergency, must guarantee performance.

Especially, but not only, in the field of fashion and furnishings, the NFC multilayer can be supplied with a different finish than the thermally sealed polymer.

When using the device, it happens that it is applied to high-end products, with a studied design and with the need to fit into a "complete" product system. In this way, by controlling the printing process, a product with a finer surface finish is obtained. An additional implementation model is the creation of devices with increased reading distance. The reading distance allows to interact with NFC devices from a higher distance. From the gained experience it turns out that the reading distance of the device described here is about 15 mm, in line with the reading data of the traditional induction devices. Now think of making a school uniform with the built-in NFC device: to track pupils' movements readers are placed along the path from the bus door or from access to school, or access to the bathrooms. These accesses are activated and managed by the NFC device worn on the boys' uniform. To optimize the features associated with the device, a reading distance greater than the 15 mm indicated above is needed. Studies and experiments have led to the creation of textile devices with a larger internal tag 2. The result has been a reading distance of even 40 mm. In fact, there is an important correlation between reading distance and size of the plastic tag. Using a tag with the same characteristics but with larger dimensions, reading distances have increased considerably. The multilayer device in this case, however, is more invasive. In addition, the electronic characteristics of the NFC tag depend on the type of DIE inserted. On the market there are several DIEs with different memory and performance characteristics. The choice of the type of DIE that can be used depends on the performance expected from the multilayer device.

Finally, in a way similar to NFC functions, it is possible to replicate textiles performances even for HF or UHF RFID devices, low energy BLE Bluetooth systems and Wi-Fi or GPS systems. Namely said multilayer device may comprise inwardly such devices in place of an NFC tag, remaining in any case inside the scope of protection of the present invention.

From the test it also emerged that the larger is the size of the antenna the grater is the reading range of the device. In this case, it is recommended to create a larger device. The geometries also vary according to the required performances. Devices with circular, square or complex geometry antennas can be created.

This innovative device has really wide applications, here, in an exemplifying but not exhaustive example, have been indicated those in which it is very competitive and diversified, especially for those applications where it is important to have a high rate of flexibility of the fabric and in which product washing is recommended. For example, in the sportswear sector, the device is used to preserve medical/health information for athletes first aid or rescue contacts for trekking. An example is the use of the device in fashion apparel for making jerseys, polo shirts, sweatshirts, etc. to save all the desired data on the shirt (name of the owner, originality certificates and production tracking, contacts in case of emergency).

An example of using the device is in the healthcare sector to save medical information of elderly people of chronic patients or, for hospitals and nursing homes, the possibility of saving the patient's medical card on the intimate shirt.

Moreover, in Promotion & Merchandising it is possible to save digital messages, photos, videos, catalogs, etc. in t-shirts and promotional clothing.

Also by way of example there is the opportunity to create animal clothing in which the home address or contact of the owner of the animal itself is stored. And yet, decorative fabrics, for high-quality productions, to indicate the originality of the product. Or also tablecloths, napkins, towels, or socks to save digital services for restaurants and hotels. Finally, it is possible to apply the device to baby carriages and strollers for the case of loss.

A further embodiment of such a multi-layered device, which is particularly advantageous and economical, consists in creating a rigid structure by means of the use of multilayer composite materials such as FR4 glasses. This material is made up of a hot pressed multilayer made up of a fabric coated with a polymeric resin. The thickness of the composite of fiber glass plates depends upon the number of thermopressed layers. Experimental tests have shown that, with substantial advantages over mechanical structure and cost-effectiveness, traditional "tags" can be incorporated between the various layers of these composite materials, while maintaining their mechanical and functionality characteristics intact dramatically reducing the thicknesses of the device with the same mechanical resistance.

In addition, by selecting the most suitable coated polymer, the product is encapsulated and protected from moisture.

Reference is made, by way of example, to the production of elastic bracelets in textile polyester comprising this multilayer device and the realization steps of:
i. sizing of a textile elastic tape such as polyester;
ii. coating on a fabric, such as a glass fiber fabric, of an epoxy resin;
iii. positioning of the traditional tag on a coated fabric sheet; preferably between the 3rd and 4th sheet of six sheets preferably used.

(The process describes how to obtain a rigid composite material (composite of fiber glass) with the already embedded tag inside it. There are usually 6 sheets of fabric impregnated with a resin. Preferably, the tag is positioned between 3th and the 4th layer. Once pressed, the tag will be at the center of the rigid material so obtained).
i. thermopressing for example, of 6 (a plurality of) of coated fabric sheets keeping at the center of the multilayer with the sheet with the tag applied as explained above. Indicative times for creating the rigid sheet are 130° C. for 10 minutes with an indicative pressure of 12 Kg. The data vary depending on the type of fabric used, the resin used and the thicknesses of the sheet to be obtained; (Obtaining rigid modules with tag embedded therein)
ii. sizing of the rigid modules as above obtained by means of traditional technologies such as laser cutting, mechanical cutting, shearing or die-cutting,
iii. sizing of the thermo-bi-adhesive material by means of traditional techniques such as laser cutting, mechanical cutting, shearing or die-cutting;
iv. sizing of thermoadhesive material, for example polyurethane PU, using traditional techniques such as laser cutting, mechanical cutting, shearing or die cutting;
v. positioning and centering, for example, by means of Pick & Place of the elastic fabric, of the bi-adhesive thermo-adhesive material, of the core, namely of the rigid and thermoadhesive composite of fiber glass module 6; (namely the hard portion with inside the tag obtained from the previous process)
vi. thermopressing by means of a thermopres for example at 160° C. for 15 seconds.

As clear and known to the skilled persons, this solution allows to simplify and reduce the phases and consequently the productive times Usable composite materials are various and depend on the performance characteristics and the cost attributable to the products. Examples of similar products are carbon fiber, fiberglass, composite of fiber glass FR4 or FR5 or natural coated glass.

Similarly, it is possible to make similar devices directly on the garments by choosing whether to couple the device directly with the fabric of the textile product or to couple it to a fabric and then apply it to the textile garment for aesthetic needs.

Finally, a further preferred embodiment of this device, which is particularly advantageous and economical, is to create a rigid structure (module) by means of an injection of rigid polymeric materials drowning within the tag or obtaining the module 6 directly from a rigid PCB with traditional electronic techniques.

This solution is mentioned by way of example only for the manufacture of bracelet obtained form elastic fabrics in which the multi-layered device becomes one with the closure of the bracelet itself:
i. sizing or unrolling from a bobbin of the impermeable thermo-bi-adhesive material;
ii. forming module 6 as described above (injection or from PCB);
iii. positioning of the modules centered on the first waterproof thermo-adhesive material;
iv. sizing or unrolling from a bobbin of a second layer of waterproof thermo-adhesive material;
v. centering of this material with the rest of the sandwich;
vi. thermopressing (1-5 sec at 100-160° C.) or application of hot air;
vii. eventual trimming of the obtained multilayer device 10';
viii. application to fabric/elastic fabric by means of ultrasonic system (1-4 sec power from 10 to 100 watts).

As clear and known to the skilled persons, this solution allows to simplify and reduce the phases and consequently the productive times. Ultrasonic sealing offers the substantial advantage of accelerating time generating in any case heat.

This heat allows the multilayer device 10,10' to adhere to the fabric. In addition, by its technical nature, ultrasounds also allow sealing of fabric over fabric. This means that with a single step (sealing of the multilayer device+sealing of the 2 edges of fabric) we can get the finished bracelet greatly reducing the working time Inside the waterproof thermo-adhesive materials melt together to create the water barrier necessary for the proper functioning of the bracelet.

Usually this work is not performed because of the "aesthetic" impact on the fabric surfaces. In reality, in cases such as the bracelets, this technology can be exploited.

It should be noted that in practice, advantageously, the steps of the method may be reversed according to needs without necessarily modifying the object of the present invention since the innovative device remains the same.

In a particularly advantageous way, therefore, the multilayer device implements a stand-alone device, ready to use in a plurality of realization forms and always in a stable, also water-resistant device.

These are just a few examples of embodiments and related production method or method of making the innovative multilayer device, preferably but not limited to, NFC, comprising one or more electronic elements such as tags or the like as described by the present invention, variants in materials, shapes, application methods, etc. are to be considered the object of the present invention as further clarified by the appended claims which form an integral part of the description text.

What is claimed is:

1. A method for the realization of a multilayer device, comprising at least the steps of:
unrolling and sizing of a first layer of a thermo-bi-adhesive dielectric impermeable material by one of an operation of mechanical cutting, laser cutting, shearing, die-cutting, waterjet, plasma cutting, and ultrasound cutting, wherein the first layer comprises a first periphery;
unrolling and sizing a second layer of a thermo-adhesive dielectric impermeable material by one of the operation of mechanical cutting, laser cutting, shearing, die-cutting, waterjet, plasma cutting, and ultrasound cutting, wherein the second layer comprises a second periphery;

providing an adhesive protective film over at least one of the first layer and the second layer;
positioning and gluing of a wireless communicable tag, having a first specific shape, by using a cartesian mechanical arm or by pick and place system on the first layer, wherein positioning and centering of the wireless communicable tag at a precise point is focused by the pick and place system, wherein the wireless communicable tag comprises:
 a transceiver having a second specific shape, wherein the second specific shape is identical to the first specific shape; and
 a third periphery, wherein the first periphery of the first layer is, concurrently, larger than the third periphery and smaller than the second periphery of the second layer;
closing of the first layer and the wireless communicable tag by the second layer such that:
 the second periphery of the second layer overlaps and extends beyond the first periphery of the first layer, and
 the first periphery of the first layer overlaps and extends beyond the third periphery of the wireless communicable tag;
thermic or thermopressing treatment at 130° C. for 4 seconds to adhere the first layer and the second layer to obtain a singular multilayer model;
positioning of the singular multilayer model directly on a textile substrate of one of polyester, cotton, cotton-polyester, nylon, nonwoven fabric, silk, wool, with or without surface treatment thereof;
unfilming the adhesive protective film from the at least one of the first layer and the second layer; and
thermopressing of the singular multilayer model on the textile substrate by a thermopress or iron at 155° C. for 15 seconds such that the second periphery of the second layer and the first layer are thermopressed on the textile substrate.

2. The method for the realization of the multilayer device according to claim 1, further comprising forming an electronic rigid module around the wireless communicable tag, wherein the electronic rigid module is made by steps comprising:
 sizing first and second rigid layers of a polymeric material or composite material from a rigid plate by one of mechanical cutting, laser cutting, shearing, die-cutting, waterjet, plasma cutting, ultrasound cutting;
 sizing of a thermoadhesive dielectric sealing layer;
 embedding of the wireless communicable tag on the thermoadhesive dielectric sealing layer by application of epoxy resins, thermoadhesive or thermo-bi-adhesive materials;
 placing the embedded wireless communicable tag on the thermoadhesive dielectric sealing layer between the first and second rigid layers; and
 thermic treating the first and second rigid layers.

3. The method for the realization of the multilayer device according to claim 2, wherein the wireless communicable tag is a NFC tag.

4. A method for the realization of a multilayer device, comprising at least the steps of:
 unrolling and sizing of a first layer of a thermo-bi-adhesive dielectric impermeable material, wherein the first layer comprises a first periphery;
 unrolling and sizing a second layer of a thermo-adhesive dielectric impermeable material, wherein the second layer comprises a second periphery;
 providing an adhesive protective film over at least one of the first layer and the second layer;
 positioning and gluing of a wireless communicable tag, having a first specific shape, on the first layer by a cartesian mechanical arm or by a pick and place system, wherein positioning and centering of the wireless communicable tag at a precise point is focused by the pick and place system, wherein the wireless communicable device comprises:
  a transceiver having a second specific shape, wherein the second specific shape is identical to the first specific shape; and
  a third periphery, wherein the first periphery of the first layer is, concurrently, larger than the third periphery and smaller than the second periphery of the second layer;
 closing of the first layer and the wireless communicable tag by the second layer such that;
  the second periphery of the second layer overlaps and extends beyond the first periphery of the first layer, and
  the first periphery of the first layer overlaps and extends beyond the third periphery of the wireless communicable tag;
 thermic or thermopressing to adhere the first layer and the second layer to obtain a singular or more multilayer model;
 positioning of the singular multilayer model directly on a textile substrate;
 unfilming the adhesive protective film from the at least one of the first layer and the second layer;
 thermopressing of the singular multilayer model on the textile substrate by a thermopress or iron such that the second periphery of the second layer and the first layer are thermopressed on the textile substrate,
 wherein the wireless communicable tag is surrounded by an electronic rigid module, wherein the electronic rigid module, around the wireless communicable tag, is made by steps comprising:
  sizing first and second rigid layers of a polymeric material or composite material;
  sizing of a thermoadhesive dielectric sealing layer;
  embedding of the wireless communicable tag on the thermoadhesive dielectric sealing layer by application of epoxy resins, thermoadhesive or thermo-bi-adhesive materials;
  placing the embedded wireless communicable tag on the thermoadhesive dielectric sealing layer between the first and second rigid layers; and
  thermic treating the first and second rigid layers, wherein the embedded wireless communicable tag on the thermoadhesive dielectric sealing layer is placed between the first and second rigid layers.

5. A method for the realization of a multilayer device, comprising at least the steps of:
 unrolling and sizing of a first layer of a thermo-bi-adhesive dielectric impermeable material, wherein the first layer comprises a first periphery;
 unrolling and sizing a second layer of a thermo-adhesive dielectric impermeable material, wherein the second layer comprises a second periphery;
 providing an adhesive protective film over at least one of the first layer and the second layer;
 positioning and gluing of a NFC tag, having a first specific shape, on the first layer by a Cartesian mechanical arm or a pick and place system, wherein positioning and centering of the NFC tag at a precise point is focused by the pick and place system, wherein the NFC tag comprises:
- a transceiver having a second specific shape, wherein the second specific shape is identical to the first specific shape; and
- a third periphery, wherein the first periphery of the first layer is, concurrently, larger than the third periphery and smaller than the second periphery of the second layer;

closing of the first layer and the NFC tag by the second layer such that:
- the second periphery of the second layer overlaps and extends beyond the first periphery of the first layer, and
- the first periphery of the first layer overlaps and extends beyond the third periphery of the NFC tag;

thermic or thermopressing to adhere the first layer and the second layer to obtain a singular multilayer model;

positioning of the singular multilayer model directly on a textile substrate;

unfilming the adhesive protective film from the at least one of the first layer and the second layer;

thermopressing of the singular multilayer model on the textile substrate such that the second periphery of the second layer and the first layer are thermopressed on the textile substrate.

\* \* \* \* \*